(12) United States Patent
van Doleweerd et al.

(10) Patent No.: US 11,285,790 B2
(45) Date of Patent: Mar. 29, 2022

(54) TRANSPARENT ROOF ASSEMBLY FOR A VEHICLE ROOF

(71) Applicant: Inalfa Roof Systems Group B.V., Oostrum (NL)

(72) Inventors: Theodorus van Doleweerd, Budel-Dorplein (NL); Sergej Sergeevič Lojko, Lottum (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 16/730,164

(22) Filed: Dec. 30, 2019

(65) Prior Publication Data
US 2020/0276891 A1 Sep. 3, 2020

(30) Foreign Application Priority Data

Mar. 1, 2019 (EP) ..................................... 19160340
Nov. 26, 2019 (EP) ..................................... 19211622

(51) Int. Cl.
*B60Q 3/00* (2017.01)
*B60J 7/043* (2006.01)
(Continued)

(52) U.S. Cl.
CPC ............ *B60J 7/043* (2013.01); *B60J 7/0573* (2013.01); *B60Q 3/208* (2017.02); *G02B 6/004* (2013.01); *G02B 6/0095* (2013.01); *G09G 3/002* (2013.01)

(58) Field of Classification Search
CPC . B60Q 3/208; B60Q 3/62; B60Q 3/64; G02B 6/004; G02B 6/0043; G02B 6/0033;
(Continued)

(56) References Cited

U.S. PATENT DOCUMENTS 9,006,751 B2 4/2015 Kleo et al.
10,025,027 B2 7/2018 Odulinski et al.
(Continued)

FOREIGN PATENT DOCUMENTS

DE 10226451 C1 7/2003
DE 102011016433 A1 10/2012
(Continued)

OTHER PUBLICATIONS

European Search Report dated Aug. 30, 2019, for corresponding European Patent Application No. 19160340.6, filed Mar. 1, 2019.

*Primary Examiner* — Y M. Quach Lee
(74) *Attorney, Agent, or Firm* — Steven M. Koehler; Westman, Champlin & Koehler, P.A.

(57) ABSTRACT

A transparent roof assembly for a vehicle roof comprises a panel with a transparent area, a light source arranged to provide light into the panel and an out-coupling pattern arranged on the surface of the transparent area of the panel. The out-coupling pattern comprises dots of a light-redirecting material for out-coupling of light introduced into the panel and propagating in the panel, wherein the dots each have a representative diameter of 150 microns or less, preferably 80 microns or less and wherein a total dot surface area of the dots of the out-coupling pattern is smaller than 10% of a total surface area of the transparent area. Thus, the transparent area appears transparent during daytime looking from an interior of the vehicle to an exterior of the vehicle, while sufficient light is provided into the interior when the light source is switched on.

19 Claims, 7 Drawing Sheets

(51) Int. Cl.
   *B60Q 3/208* (2017.01)
   *B60J 7/057* (2006.01)
   *F21V 8/00* (2006.01)
   *G09G 3/00* (2006.01)

(58) Field of Classification Search
   CPC ........ G02B 6/005; G02B 6/0095; B60J 7/043;
                           B60J 7/0573; G09G 3/002
   See application file for complete search history.

(56) References Cited

U.S. PATENT DOCUMENTS

| | | | |
|---|---|---|---|
| 10,300,849 B2 | 5/2019 | Barillot et al. | |
| 2012/0134173 A1* | 5/2012 | Mueller | B60Q 3/64 362/602 |
| 2012/0195065 A1* | 8/2012 | Hyakuta | G02B 6/0065 362/624 |
| 2012/0287665 A1* | 11/2012 | Hyakuta | G02B 6/0043 362/602 |
| 2014/0043850 A1 | 2/2014 | Thompson et al. | |
| 2015/0003106 A1 | 1/2015 | Thompson et al. | |
| 2015/0298601 A1* | 10/2015 | Bott | B60Q 3/208 362/520 |
| 2016/0041331 A1 | 2/2016 | Odulinski et al. | |
| 2017/0336555 A1* | 11/2017 | Yanai | G02B 6/0055 |
| 2018/0086260 A1 | 3/2018 | Barillot et al. | |
| 2018/0201189 A1 | 7/2018 | Kim | |
| 2020/0041846 A1* | 2/2020 | Mizuguchi | G02F 1/133611 |

FOREIGN PATENT DOCUMENTS

| | | |
|---|---|---|
| DE | 102016005679 A1 | 11/2017 |
| EP | 3300940 A1 | 4/2018 |
| FR | 3043025 A1 | 5/2017 |
| WO | 2014140502 A1 | 9/2014 |

* cited by examiner

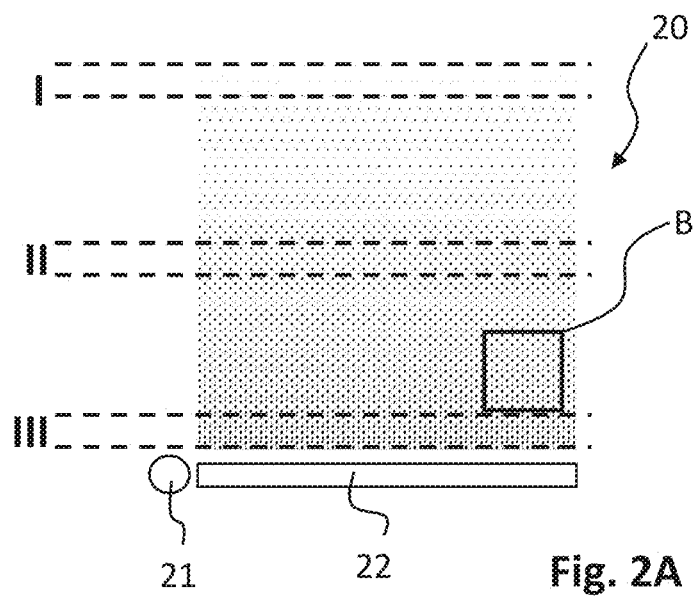
Fig. 2A
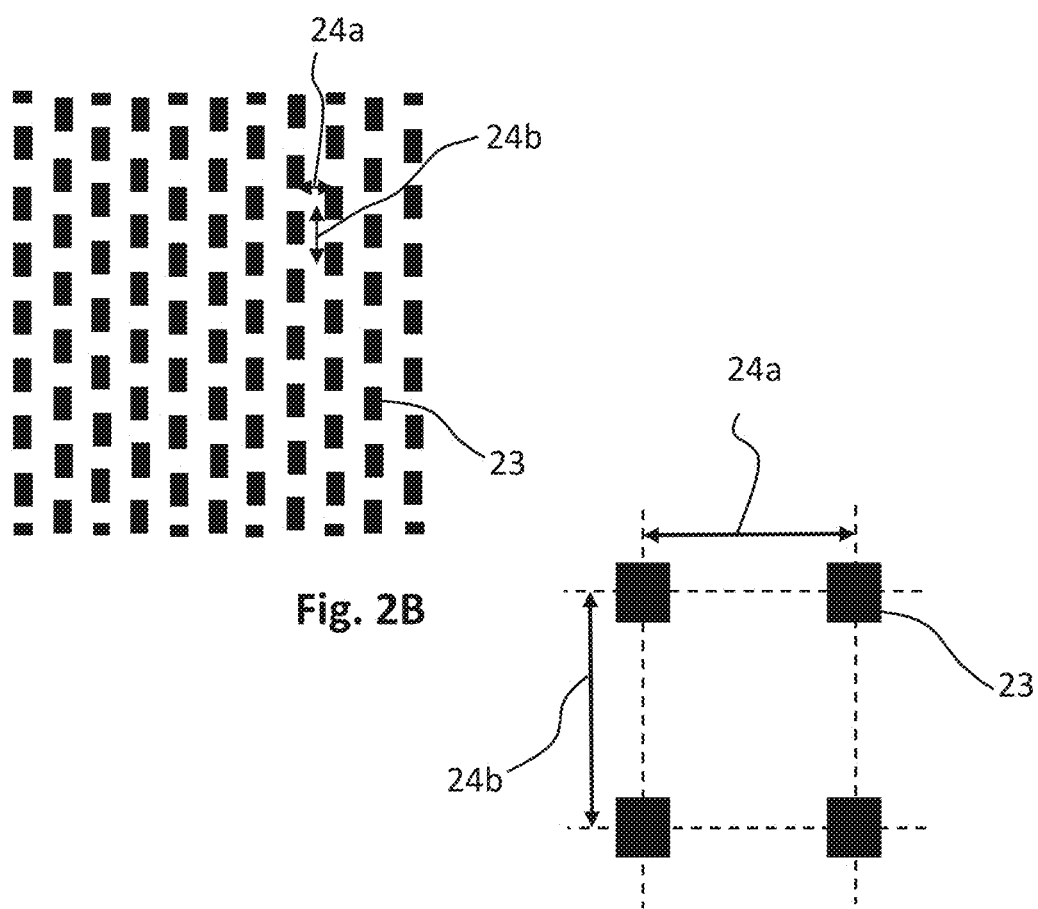
Fig. 2B
Fig. 2C

TRANSPARENT ROOF ASSEMBLY FOR A VEHICLE ROOF

BACKGROUND

The discussion below is merely provided for general background information and is not intended to be used as an aid in determining the scope of the claimed subject matter.

The invention relates to a transparent roof assembly for a vehicle, wherein a light source is arranged to provide light into a panel of the transparent roof assembly, using the panel as a light guide, and applying suitable structures on the panel to couple out the light at a location of said structures.

A transparent roof assembly for a vehicle is generally known. For example, a glass panel is arranged over an opening in the roof of a vehicle to allow sunlight to enter an interior of the vehicle through the roof. In a known transparent roof assembly, the at least partly transparent panel is fixedly arranged over the opening, while in another known transparent roof assembly the panel is moveably arranged. In particular, the moveably arranged panel may be tiltable and/or slideable.

Further, it is known to arrange a light source in a vicinity of an edge of the at least partly transparent panel such that light emitted by the light source is injected into the panel and the light propagates through the panel, wherein the panel functions as a light guide. In order to direct the light into the interior of the vehicle, light out-coupling structures are provided. For example, light reflecting dots may be arranged on a first surface of the panel. Light propagating in the panel and impinging on such reflective dots on the first surface is then redirected towards on opposite, second surface and leaves the panel at the second surface, thereby illuminating the interior of the vehicle.

In order to achieve light out-coupling as functional illumination, in the known transparent roof assembly, relatively large reflective dots are applied. The dots have a relatively large diameter. When illuminated, in particular with a dark background, e.g. in the night, the reflective dots light up clearly appearing separate light sources, thereby providing the functional illumination. However, e.g. during daytime with a light background, the dots are perceived as dark dots, obstructing the view.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An open roof assembly includes a panel, a light source and an out-coupling pattern. The panel has a transparent area and is configured to be arranged over an opening in the vehicle roof to allow visible light to pass in a first direction through the transparent area. The first direction extends between an interior of the vehicle and an exterior of the vehicle and is substantially perpendicular to a surface of the panel. The light source is arranged to provide light in the panel in a second direction, wherein the second direction is substantially perpendicular to the first direction. The out-coupling pattern is arranged on the surface of the transparent area of the panel and comprises dots of a light-redirecting material for out-coupling of light propagating in the panel. Each dot has a dot surface area and the dots each have a representative diameter of 80 microns or less. The representative diameter of a dot corresponds to a diameter of a circle having a same surface area as the dot surface area of said dot. A total dot surface area is smaller than 10% of a total surface area of the transparent area, wherein the total dot surface area of the dots of the out-coupling pattern equals a sum of the dot surface area of all dots arranged on the surface of the transparent area.

AccSmall dots are applied in a pattern, wherein no more than 10% of the surface area of the transparent area of the panel is covered with dots. The dots may take any kind of form or shape. At a normal viewing distance in a vehicle, these dots are preferably not individually distinguishable by the human vision due to their size. Therefore, the representative diameter may preferably be smaller than 80 microns. Moreover, as less than 10% of the surface is covered, a view through the transparent area appears a clear view without obstructions. On the other hand, when illuminated by the light source, the small dots redirect the light into the interior, albeit that no clear and individual light source may be noticeable.

In a particular embodiment, however, the representative diameter may be larger than 80 microns. In such embodiment, the dots may be individually distinguishable, depending on the normal viewing distance which varies between vehicle types. Still, if the representative diameter of the dots remains smaller than about 150 microns, the dots remain invisible when the viewer focuses on the exterior viewings. In particular, due to the exterior light and the focus of the viewer being directed at a plane far away from the plane of the dots, the dots disappear in the viewed image.

In an embodiment, the representative diameter of the dots is within a range from about 50 microns to about 70 microns. Such dots are easily and cost-effectively manufacturable by screen printing. In another embodiment, the representative diameter is within a range from about 20 microns to about 50 microns. Dots with a size in this range may be provided by inkjet printing, for example. Due to their very small size, such dots are even more difficult to detect with the human eye.

Screen printing is a method that is very suitable to be used in combination with glass and other transparent materials used for a transparent roof system.

Inkjet printing is a manufacturing technique that allows for very small droplets of ink with relatively high accuracy in droplet size and droplet positioning, enabling to provide for a highly accurate and uniform distribution of the dots in the out-coupling pattern.

Inkjet printing may be a suitable manufacturing method for printing the dots on a flexible foil or web of material that is later used as an interlayer in a multi-layered panel. For example, the dots may be printed on a Polyvinyl Butyral ("PVB") or Ethylene Vinyl Acetate ("EVA") foil. The printed PVB or EVA foil may then be arranged between two plies of glass. In particular, the printed surface of the foil may be arranged on a surface of the glass ply in which light is to be coupled in such that the printed dots are in contact with such glass ply for coupling out the light. In particular due to the small size and low surface coverage, the adherence strength between the glass ply and the EVA or PVB interlayer may remain sufficient.

An ink applied by either screen printing or inkjet printing or any other suitable technique, may be a white reflective ink to provide for the light-redirecting property. Further, a photoluminescent ink may be applied alternatively or additionally. Of course, the inkjet ink may be both reflective and photoluminescent. A photoluminescent ink may for example convert UV-light into visible light. Therefore, in a particular embodiment, at least two light sources may be provided: one light source outputting visible light that is reflected and one light source outputting UV light that is converted. Moreover, the light out-coupling pattern may be designed such that a certain light effect may be selectively obtained by suitable selecting one of the available light sources.

In an embodiment, the total dot surface area may be in a range from about 1% to about 7% and preferably in a range from about 3% to about 6% and more preferably in a range from about 4% to 5% of a total surface area of the transparent area. Using suitable light sources, in particular with respect to light output, it may suffice to further reduce the dot coverage of the transparent area. With a reduced coverage, the visibility of the dots is further reduced. It is noted that with sufficient intensity of light output by the light source, the coverage may be even further reduced in accordance with a desired light output of the out-coupling pattern.

In an embodiment, the dots are regularly arranged on the surface, wherein the dots are arranged at a spacing distance between adjacent dots. In particular, the spacing distance is more than 3 times the representative diameter, preferably more than 4 times the representative diameter and more preferably 5 times the representative diameter. Thus, low visibility of the pattern and correspondingly a high transparency is obtained.

In an embodiment, the light source comprises multiple LED's. For example, single LED's may be arranged regularly around a perimeter of the panel to provide a uniform light output over the transparent area. In another example, multiple LED's may be arranged at substantially the same position, wherein each LED may output a different color of light, e.g. three LED's may output red, green and blue light, respectively. Thus, virtually any color of light may be generated by controlling the light output per LED, as well known in the art. In general, using multiple LED's allows to provide for light effects.

In an embodiment, a dot coverage close to the light source is lower compared to the dot coverage farther away from the light source. As above indicated, a dot coverage is a ratio of a total dot surface area of all dots in a unit area over a total surface area of the unit area. With a higher dot coverage, more light is coupled out, while a lower dot coverage, less light is coupled out. Close to the light source, more light is available, while farther away from the light source, the amount of light is less. In order to achieve a uniform light output over the transparent area, the dot coverage close to the light source may be reduced and farther away from the light source, the dot coverage may be increased. Of course, it is noted that in another embodiment, another light effect may be desired and then a local dot coverage may be selected differently.

Further, in an embodiment, the panel may comprise an opaque area and a dot coverage in the opaque area may be higher than in the transparent area. In known transparent roof assemblies, the transparent area of the panel is surrounded by an opaque area, e.g. a black area provided by an enamel layer. Such an opaque area may, for example, be provided to cover functional elements of the open roof assembly or for any other reason. In such an opaque area, in view of the lack of transparency, the dot coverage may be relatively high and/or the dot surface area may be selected larger. Thus, in such an opaque area, the light output may be higher.

In a further embodiment, the panel may comprise an uncovered area wherein no dots are arranged. In particular, such an uncovered area may be provided adjacent to an edge of the panel where light is coupled into the panel by individual light sources, like LED light sources. In the uncovered area, very little or no light is coupled out, allowing the light from the individual light sources to mix and blend, preventing that the individual light sources are visible in the light image. For example, an array of individual LED's with three different colors, e.g. red, green and blue (RGB), may be provided and the uncovered area may be designed and arranged to allow the three colors to mix to white light before the light is out-coupled.

In an embodiment, the transparent roof assembly further comprises an image projector for projecting a light image, wherein the image projector is arranged to project the light image on the out-coupling pattern. Instead of switching on the light source, an image projector may be used to project an image or movie on the out-coupling pattern. Whereas the prior art patterns with relatively large dots were not suitable to provide for a sufficient image quality for viewing, the out-coupling pattern of the present invention provides for sufficient image resolution for showing a projected image or movie. The image projector may be position at any suitable location in a vehicle. For example, the projector may be arranged in a head rest of a driver seat or a passenger seat or, using suitable optics, even directly underneath the roof. Thus, compared to the course patterns of the prior art, the micro-dot pattern of the present invention is suitable for many more applications.

With the micro-dot pattern as a planar source of light, in an embodiment, the transparent roof assembly may be provided with a display layer and in particular with a liquid crystal display (LCD) layer. As a planar source of light, the micro-dot pattern is suitable as a source of backlight for the LCD display layer. Moreover, during daylight conditions, the LCD display layer may also be used as a means for filtering the light or for shielding against an excessive amount of light, thereby functioning as a sunshade.

BRIEF DESCRIPTION OF THE DRAWINGS

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description with reference to the appended schematical drawings, in which:

FIG. 2A shows a prior art out-coupling pattern;

FIG. 2B shows an enlarged part of the out-coupling pattern of FIG. 2A;

FIG. 2C shows four dots of the out-coupling pattern of FIG. 2A;

DETAILED DESCRIPTION OF THE ILLUSTRATIVE EMBODIMENTS

Figure 1A:
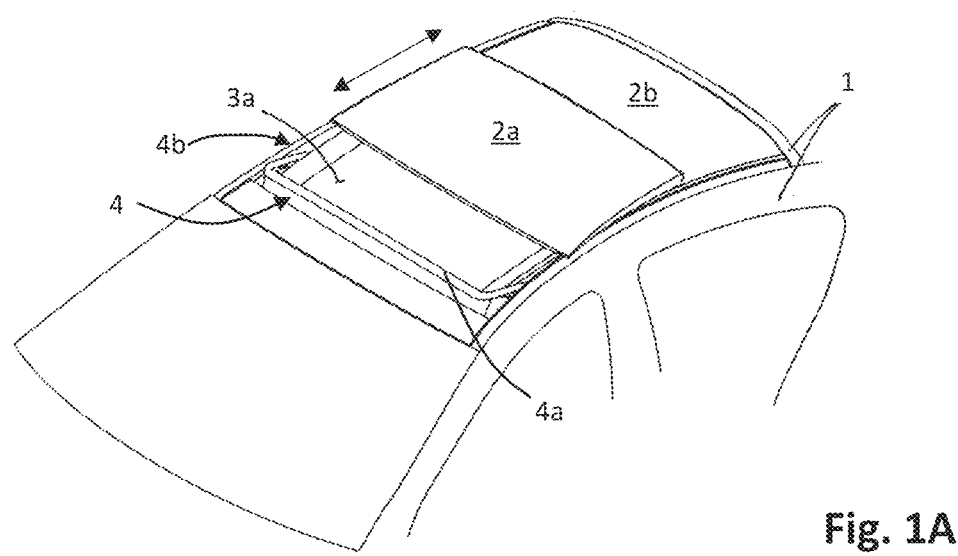
FIG. 1A shows a perspective view of a vehicle roof with an open roof assembly.

The present invention will now be described with reference to the accompanying drawings, wherein the same reference numerals have been used to identify the same or similar elements throughout the several views.

FIG. 1A illustrates a vehicle roof 1 having an open roof assembly arranged therein. The open roof assembly comprises a moveable panel 2a and a fixed panel 2b. The moveable panel 2a is also referred to as a closure member, since the moveable panel 2a is moveable over a first roof opening 3a such to enable to open and to close the first roof opening 3a. A wind deflector 4 is arranged at a front side of the first roof opening 3a.

In the illustrated embodiment, the moveable panel 2a may be in a closed position, which is a position wherein the moveable panel 2a is arranged over and closes the first roof opening 3a and thus usually is arranged in a plane of the vehicle roof 1. Further, the moveable panel 2a may be in a tilted position, which is a position wherein a rear end RE of the moveable panel 2a is raised as compared to the closed position, while a front end FE of the moveable panel 2a is still in the closed position. Further, the moveable panel 2a may be in an open position, which is a position wherein the moveable panel 2a is slid open and the first roof opening 3a is partly or completely exposed. It is noted that in FIG. 1A, the moveable panel 2a is in the open position.

It is noted that the illustrated vehicle roof 1 corresponds to a passenger car. The present invention is however not limited to passenger cars. Any other kind of vehicles that may be provided with a moveable panel are contemplated as well.

Figure 1B:
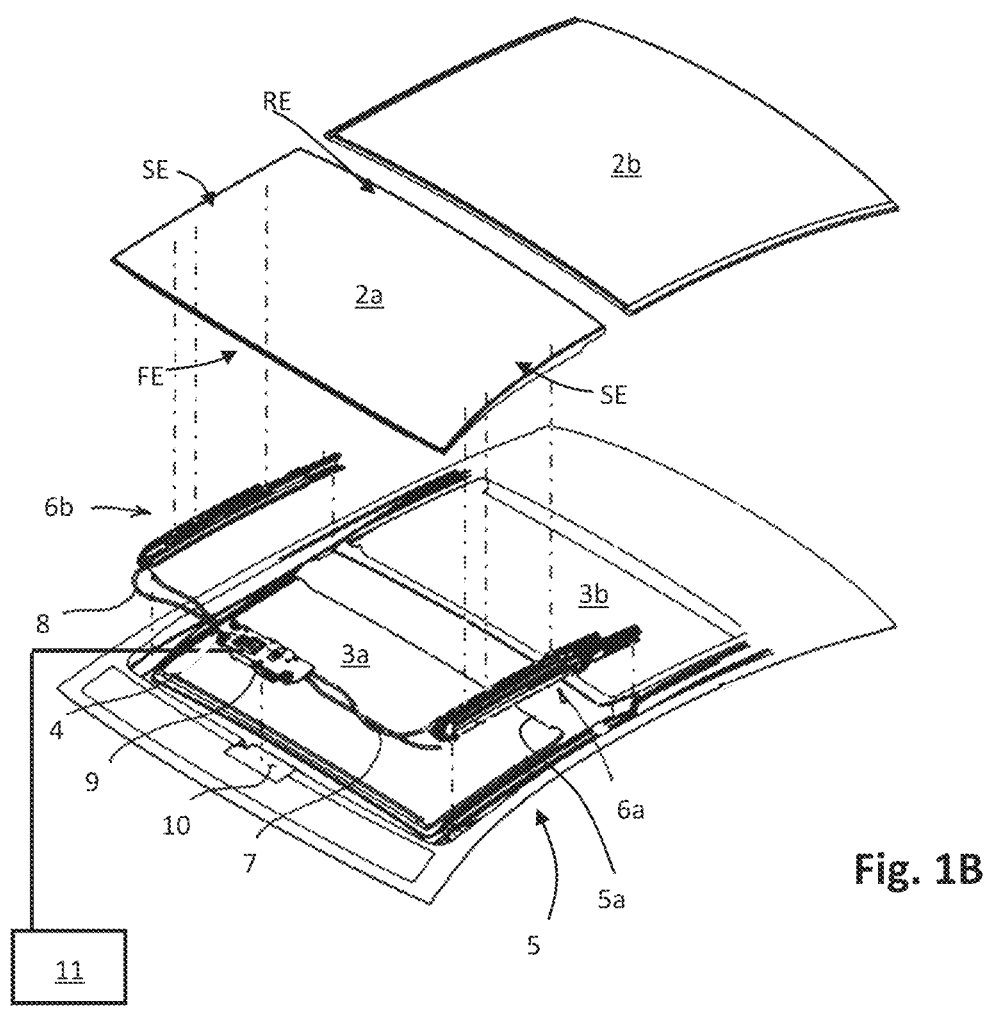
FIG. 1B shows an exploded view of the open roof assembly of FIG. 1A.

FIG. 1B illustrates the same vehicle roof as shown in FIG. 1A having panels 2a and 2b. In particular, while FIG. 1A shows the open roof assembly in the open position, FIG. 1B is an exploded view of the open roof assembly in a closed position. Further, in this exploded view of FIG. 1B, it is shown that there is a second roof opening 3b. The first and second roof openings 3a, 3b are provided in a frame 5 of the open roof assembly. An edge 5a of the frame 5 defines the first roof opening 3a.

The second roof opening 3b is arranged under the fixed panel 2b such that light may enter a vehicle interior space through the fixed panel 2b, presuming that the fixed panel 2b is a glass panel or a similarly transparent panel, for example made of a plastic material or any other suitable material. The second roof opening 3b with a transparent or translucent fixed panel 2b is optional and may be omitted in another embodiment of the open roof assembly.

The wind deflector 4 is commonly a flexible material, e.g. a woven or non-woven cloth having through holes arranged therein or a web or net. The flexible material is supported by a support structure 4a, e.g. a bar-like or tube-like structure, which structure is hingedly coupled, directly or indirectly, to the frame 5 at a hinge 4b.

The wind deflector 4 is arranged in front of the first roof opening 3a and adapts air flow when the moveable panel 2a is in the open position. In its raised position, the wind deflector 4 reduces inconvenient noise due to air flow during driving. When the moveable panel 2a is in the closed position or in the tilted position, the wind deflector 4 is held down below the front end FE of the moveable panel 2a.

Usually, the wind deflector 4 is raised by a spring force when the moveable panel 2a slides to an open position and the wind deflector 4 is pushed down by the moveable panel 2a when the moveable panel 2a slides back into its closed position. In FIG. 1A, the moveable panel 2a is shown in an open position and the wind deflector 4 is shown in a raised position. In FIG. 1B, the moveable panel 2a is shown in a closed position and the wind deflector 4 is correspondingly shown in a position in which it is held down.

FIG. 1B further illustrates a drive assembly having a first guide assembly 6a, a second guide assembly 6b, a first drive cable 7 and a second drive cable 8. The first and second guide assemblies 6a, 6b are arranged on respective side ends SE of the moveable panel 2a and may each comprise a guide and a mechanism. The guide is coupled to the frame 5, while the mechanism comprises moveable parts and is slideably moveable in the guide. The first and the second drive cables 7, 8 are provided between the mechanisms of the respective guide assemblies 6a, 6b and a drive motor 9.

The drive cables 7, 8 couple the drive motor 9 to the mechanisms of the respective guide assemblies 6a, 6b such that upon operating the drive motor 9, the mechanisms start to move. In particular, a core of the drive cable 7, 8 is moved by the drive motor 9 such to push or pull on the mechanisms of the respective guides 6a, 6b. Such a drive assembly is well known in the art and is therefore not further elucidated herein.

In the illustrated embodiment, the guide assemblies 6a, 6b may start movement with raising the rear end RE of the moveable panel 2a, thereby bringing the moveable panel 2a in the tilted position. Then, from the tilted position, the guide assemblies 6a, 6b may start to slide to bring the moveable panel 2a in the open position. The present invention is however not limited to such embodiment. For example, in another embodiment, the moveable panel 2a may be moveable to a tilted position by raising the rear end RE, while an open position is reached by first lowering the rear end RE and then sliding the moveable panel 2a under the fixed panel 2b or any other structure or element provided behind the rear end RE of the moveable panel 2a. In further exemplary embodiments, the moveable panel 2a may be merely moveable between a closed position and a tilted position or between a closed position and an open position.

In the illustrated embodiment, the drive motor 9 is mounted near or below the front end FE of the moveable panel 2a at a recess 10. In another embodiment, the drive motor 9 may be positioned at any other suitable position or location. For example, the drive motor 9 may be arranged near or below the rear end RE of the moveable panel 2a or below the fixed panel 2b.

A control unit 11 is schematically illustrated and is operatively coupled to the drive motor 9. The control unit 11 may be any kind of processing unit, either a software controlled processing unit or a dedicated processing unit, like an ASIC, as well known to those skilled in the art. The control unit 11 may be a stand-alone control unit or it may be operatively connected to another control unit, like a multipurpose, generic vehicle control unit. In yet another embodiment, the control unit 11 may be embedded in or be part of such a generic vehicle control unit. Essentially, the control unit 11 may be embodied by any control unit suitable for, capable of and configured for performing operation of the drive motor 9 and thus the moveable roof assembly.

The open roof assembly may further comprise an illumination system. FIG. 2A shows a prior art pattern of reflective dots that are arranged on a surface of the moveable panel 2a and/or the fixed panel 2b. In the prior art system, a light source 21, e.g. an LED or an incandescent lamp or any other suitable light source, directs light into a light guide 22, which may be cylindrical unit of transparent material. As known in the art, light may propagate through the light guide 22. Due to total internal reflection at a boundary between the material of the light guide 22 and the surrounding air, the light is retained in the light guide 22. Where the surface of the light guide 22 is not in contact with air, light may exit the light guide 22 or be reflected back into the light guide 22 at an angle such that the light may exit the light guide 22 at an opposite surface. With a known suitable configuration, the light originating from the light source 21 propagates through the light guide 22 and into a transparent panel on which the out-coupling pattern 20 is provided. For example, the out-coupling pattern 20 may be formed from a reflective paint or ink, e.g. a white paint or ink. As above mentioned, the dots of reflective paint or ink prevent total internal reflection of the light rays. Instead, the light rays impinging on the reflective dots reflect under another angle and are enabled to exit the transparent panel at the opposite surface. With a suitable configuration, it is thus enabled to direct the light from the light source 21 to the interior of a vehicle.

Section B of the out-coupling pattern 20 is shown in more detail in FIG. 2B. The out-coupling pattern 20 comprises the reflective dots 23 in a predetermined pattern. In particular, the reflective dots 23 are arranged at a lateral spacing distance 24a and a longitudinal spacing distance 24b, to either of which may be referred to as a spacing distance 24. The spacing distance is the distance from a center of a dot to the center of an adjacent dot, commonly also referred to as the pitch.

In a particular embodiment, the lateral and longitudinal spacing distances 24a and 24b may be substantially equal. As used herein, the spacing distance 24 may refer to either of the longitudinal and lateral spacing distance 24a, 24b, as above mentioned, and, despite that only reference is made to the spacing distance 24 in general, the longitudinal and lateral spacing distances 24a, 24b may be equal or not. The person skilled in the art readily understands how to select and provide a suitable longitudinal spacing distance 24b and a suitable lateral spacing distance 24a in dependence of each other.

With reference to FIG. 2A, the spacing distance 24 may vary over the surface of the moveable panel 2a or fixed panel 2b. For example, in first area I, a relative small amount of relatively small dots may be present. In a second area II, more relatively small dots may be present, while in a third area III, the number of dots may be significantly larger and the size of the dots may be significantly larger. Of course, in an embodiment, the size of the dots in an area and the number of dots in such an area may be selected independently, albeit that an illumination effect will depend on, inter alia, both these aspects. So, in order to achieve a desired illumination effect, these aspects may be selected in dependence of each other.

As illustrated in more detail in FIG. 2C, in the first area I, the dots have a substantially square dot shape with a size of about 1.5×1.5 mm. A dot surface area of such 5 dots is 2.25 mm2. For ease of comparison herein, such dots are referred to as having a representative diameter of about 1.69 mm as a circular dot with a diameter of 1.69 mm has a same dot surface area of 2.25 mm2. While the present invention is not limited to any kind of form or shape of the reflective dots, a representative diameter may be determined and assigned based on their dot surface area. With a spacing distance 24a, 24b of about 6.1 mm, there is one dot per area of about 6.1×about 6.1 mm. Consequently, the dots locally cover about 2.25/37.21=about 0.06 of the total surface area. Therefore, a total surface area coverage is about 6%.

In the third area III, the reflective dots have an elongated rectangular shape of about 1.5×5 mm (7.5 mm$^2$) with a spacing distance of 6.1 mm. Thus, the total surface area coverage is about 18%. In the second area II, the total surface area coverage is about 12%.

With an experimental setup, a luminance of the first, second and third area I, II and III have been measured:

TABLE 1

| Area | Coverage [%] | Luminance [cd/m$^2$] |
|---|---|---|
| I | 6 | 0.0377 |
| II | 12 | 0.0830 |
| III | 18 | 0.3274 |

As apparent from Table 1, the measured luminance is not proportional to the total surface area coverage (column: "Coverage"). Of course, in this prior art embodiment, the third area III with the highest total surface area coverage is arranged closest to the light guide 22. Inevitably, the highest luminance may be expected in the third area III due to both the smallest distance to the light guide 22 and the highest total surface area coverage of the out-coupling pattern 20.

It is noted that the size of the dots of the prior art embodiment of FIGS. 2A-2C is relatively large. This relatively large size provides for dots clearly lighting up, when the light source 21 is switched on. Further, the relatively small total surface area coverage in the first area I provides for a view to the outside. On the other hand, due to the size of the dots, the dots remain individually clearly visible, even in the first area I. Moreover, due to the number of the relatively large dots, a view to the outside is limited in the third area.

Figure 3A:
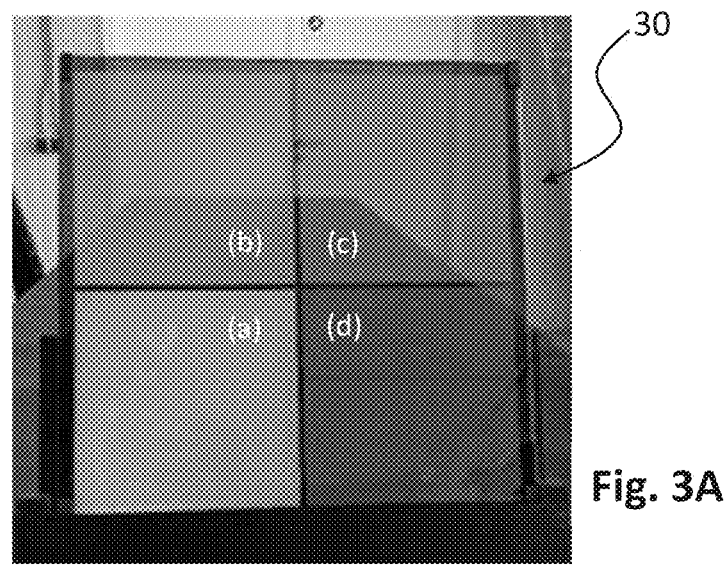
FIG. 3A shows a glass panel having four exemplary out-coupling patterns arranged thereon.

FIG. 3A shows a photograph of a glass panel 30 having four areas (a)-(d). Each area (a)-(d) is provided with an out-coupling pattern according to the present invention. The out-coupling patterns of areas (a)-(d) comprise dots having a representative diameter of about 50 micrometer and are formed from white screen print ink by screen printing on a surface of the glass panel 30. The dots are arranged on a Cartesian grid, although the present invention is not limited with respect to the grid. The dots may be arranged uniformly on a regular grid, like a Cartesian grid, or may be arranged in accordance with any other regular or irregular grid. The areas (a)-(d) vary in the spacing distance between the dots as illustrated also in FIG. 3C:

TABLE 2

| Area | Spacing distance [mm] | Coverage [%] |
|---|---|---|
| (a) | 0.15 | 8.7 |
| (b) | 0.17 | 6.8 |
| (c) | 0.20 | 4.9 |
| (d) | 0.25 | 3.1 |

In the photograph, the glass panel 30 is arranged substantially vertically on a table. There is only ambient light; there is no light coupled into the glass panel 30. A relatively large amount of light is incident on the front of the glass panel 30, due to which the reflective dots reflect a significant amount of light resulting in a greyish appearance. Still, as apparent at least for areas (b), (c) and (d), the background is clearly visible through the glass panel 30. For area (a) it is noted that the uniform dark background of the table top results in an appearance of a white surface. In practice, however, in a relatively dark interior of a vehicle and relatively light exterior, the white appearance diminishes.

Figure 3B:
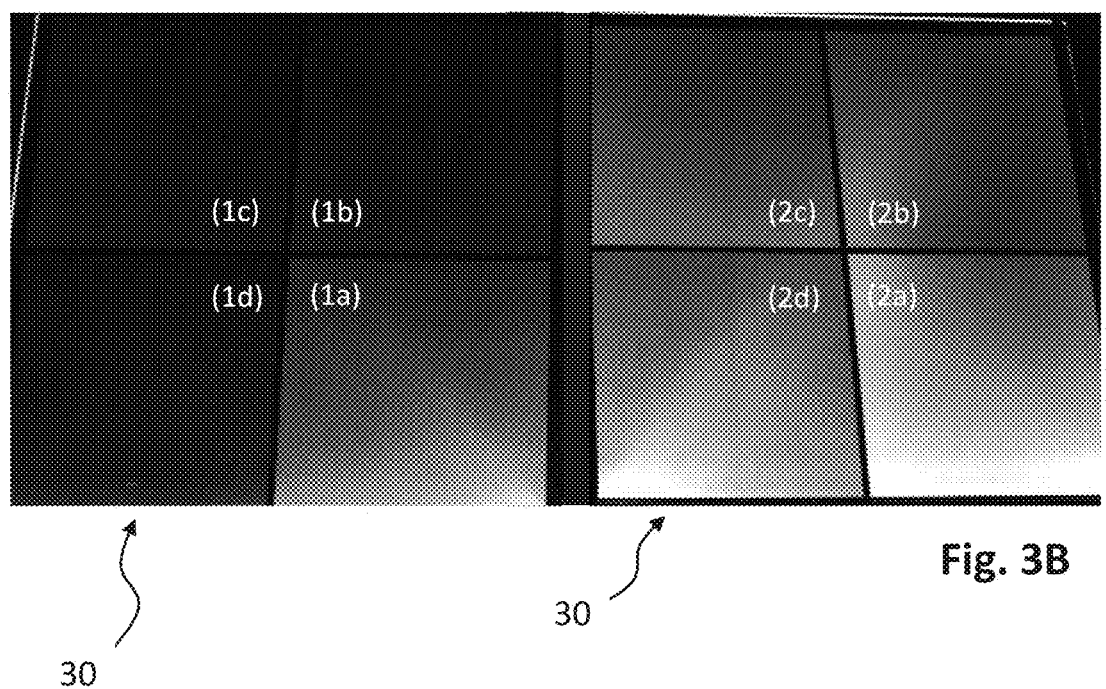
FIG. 3B shows two glass panels having each four exemplary out-coupling patterns arranged thereon.

FIG. 3B shows a photograph of two glass panels 30 with a total of eight areas (1a)-(1d) and (2a)-(2d). The areas (2a)-(2d) correspond to the areas (a)-(d), respectively, as shown in and described in relation to FIGS. 3A and 3C. The areas (1a)-(1d) have an out-coupling pattern similar to the areas (a)-(d), respectively, as described in Table 2 hereinabove and shown in FIG. 3C. However, while the areas (2a)-(2d) have been formed with an opaque white ink, the areas (1a)-(1d) have been formed with a semi-transparent white ink. A part of light incident on the semi-transparent dots may pass through the semi-transparent ink, while another part of the incident light will be reflected. The ratio of passing light and reflected light depends, inter alia, on the specific properties of the ink and a thickness of the dots. While a semi-transparent ink reflects less light per unit area compared to an opaque white ink, it may provide a more transparent appearance during daytime, when looking through the transparent panel to the exterior surroundings.

In FIG. 3B, there is no ambient light, but light is provided through a light guide (cf. FIG. 2A) into the glass panel 30. The areas (1a)-(1d) and (2a)-(2d) light up due to the out-coupling of the light by the out-coupling patterns. Referring to the first glass panel 30 with areas (1a)-(1d) with semi-transparent ink, one area (1a) reflects a significant amount of light, while the other three areas (1b)-(1d) reflect less light. The areas (2a)-(2d) on the second glass panel 30 are all clearly lit up. Even the least dense area (2d) with opaque white ink provides more light output than the densest area (1a) with semi-transparent ink. So, depending on application and desired appearance, a semi-transparent or an opaque ink may be used.

For comparison reasons, the actual luminance of the glass panel 30 with the semi-transparent ink has been measured for three sub-areas (cf. FIG. 2A: I, II, III) for the brightest area (1a):

TABLE 3

| Area | Coverage [%] | Luminance [cd/m$^2$] |
|---|---|---|
| (1a)-I | 8.7 | 0.0413 |
| (1a)-II | 8.7 | 0.0861 |
| (1a)-III | 8.7 | 0.3248 |

The luminance of the densest out-coupling pattern of semi-transparent ink is comparable to the luminance of the prior art out-coupling pattern despite the fact that the average total surface area coverage is significantly lower (8.7% vs. 12.2%).

Figure 3C:
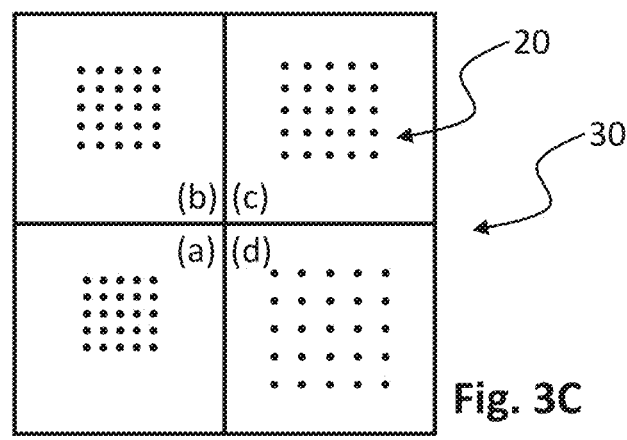
FIG. 3C illustrates the four out-coupling patterns of the glass panels of FIGS. 3A and 3B.
Figure 3D:
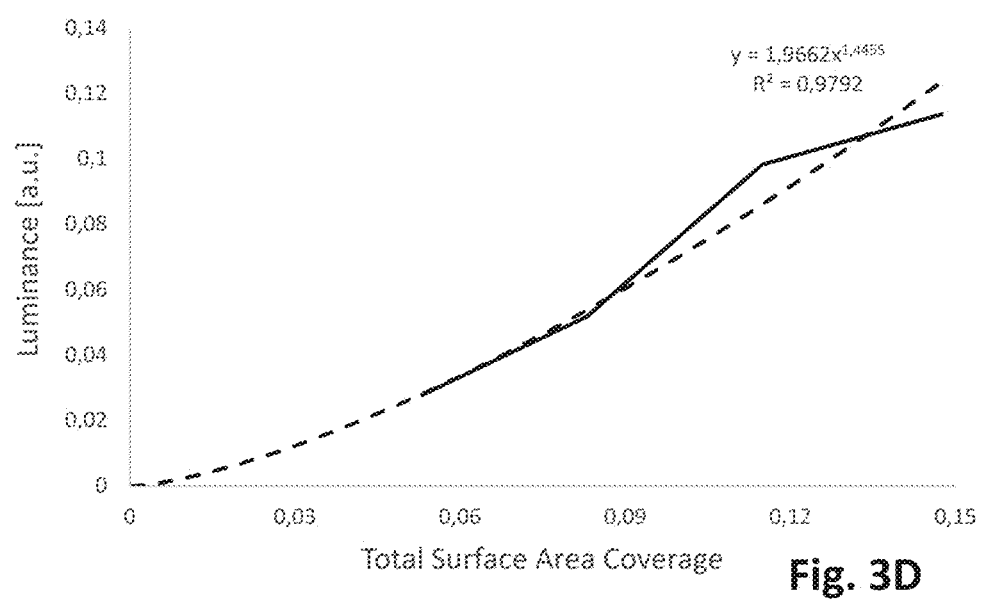
FIG. 3D shows a graph illustrating an amount of out-coupled light (luminance) as a function of area coverage.

In FIG. 3D, a graph (solid line) of an average luminance of each of the four out-coupling patterns (1a)-(1d) of FIG. 3B is shown. For each out-coupling pattern (1a)-(1d) of FIG. 3B, a minimum local luminance, a maximum local luminance and an average luminance is determined. The luminance is determined for each out-coupling pattern (1a)-(1d) with each out-coupling pattern (1a)-(1d) arranged close to the light guide 22. The corresponding measurement data are shown in Table 4. FIG. 3D further shows a trend line (dashed line) based on the measured average luminance.

TABLE 4

| Pattern | Coverage [%] | Minimum Luminance [cd/m$^2$] | Maximum Luminance [cd/m$^2$] | Average Luminance [cd/m$^2$] |
|---|---|---|---|---|
| (1a) | 8.7 | 0.0014 | 1.6810 | 0.1137 |
| (1b) | 6.8 | 0.0014 | 1.3090 | 0.0982 |
| (1c) | 4.9 | 0.0011 | 0.8180 | 0.0519 |
| (1d) | 3.1 | 0.0011 | 0.9526 | 0.0279 |

Based on the measurement data, it has appeared that the luminance of the different out-coupling patterns 20 of the panel 30 is not proportional to the total surface area coverage of the out-coupling pattern 20. Instead, with a decreasing total surface area coverage, the luminance appears to decrease less than proportional. So, the luminance resulting from a less dense out-coupling pattern appears higher than what was expected. This enables to reduce the total surface area coverage more than would have been expected on an assumption of a proportional dependency of the luminance on the total surface area coverage.

It is noted that in the prior art embodiment of FIGS. 2A-2B, an opaque pattern is used, while in the embodiment used to obtain the data of Tables 3 and 4 a semi-transparent ink is used. Thus, in an embodiment of the present invention having semi-transparent ink dots, with outside day light, the view is not obstructed and a clear view is provided, while a same amount of light is output into the interior of the vehicle, when the light source is switched on, as compared to the prior art embodiment having relatively large dots. Further, with an opaque ink instead of a semi-transparent ink, the luminance is further increased (cf. FIG. 3B) allowing to further reduce the total surface area coverage without reducing the luminance.

Figure 4A:
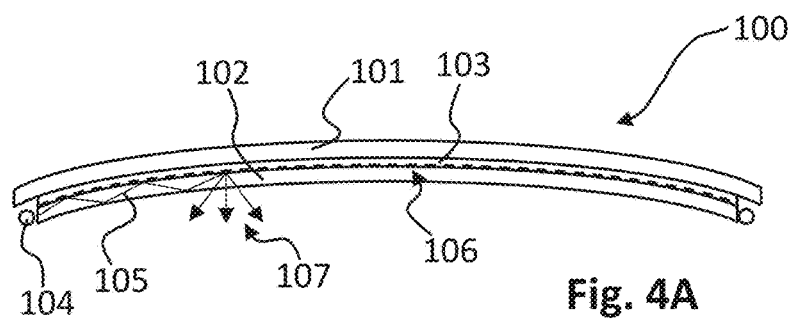
FIG. 4A shows a cross-section of an embodiment of a multi-layered glass panel for use in the present invention.

FIG. 4A shows a cross-section of a multi-layered glass panel 100 for use in an open roof assembly according to the present invention, wherein an exterior glass panel 101 and an interior glass panel 102 are attached by an interlayer 103. Such an interlayer is known in the art. For example, the interlayer 103 may be formed of EVA or PVB. Other materials are known and suitable as well.

At a side edge of the interior glass panel 102, a light source 104 is provided. The light source 104 may be any light source suitable for coupling light 105 into the interior glass panel 102 through its side edge. For example, known light sources are LED's directing light directly into the side edge of the interior glass panel 102 or, alternatively or additionally, an elongated, side-emitting light guide arranged next to the side edge of the interior glass panel 102 (cf. FIG. 2A).

As hereinabove also described in relation to FIG. 2A but shown in more detail in FIG. 4A, an out-coupling pattern 106 is provided at a surface of the interior glass panel 102. In particular, the out-coupling pattern 106 is arranged at an interface between the interior glass panel 102 and the interlayer 103. As shown, a ray of light 105 propagates through the interior glass panel 102 and may impinge on a dot of the out-coupling pattern 106. Upon impingement, the ray of light 105 is at least partly reflected and reflected light rays 107 are enabled to leave the interior glass panel 102 at an opposite surface of the interior glass panel 102 and is thus emitted into an interior passenger compartment 108 of a vehicle.

Figures 4B, 4C:
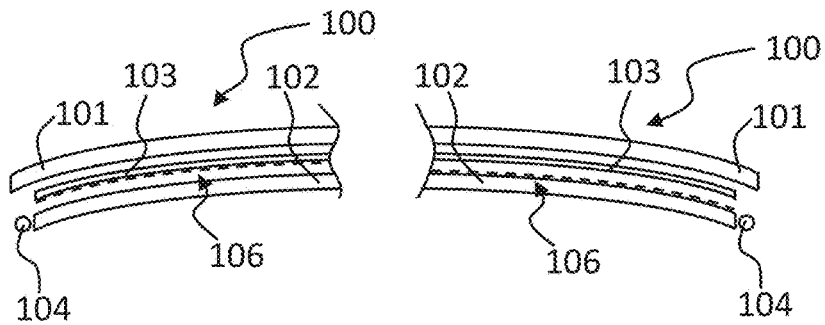
FIG. 4B shows an exploded cross-section according to a first embodiment of providing the glass panel according to FIG. 4A.
FIG. 4C shows an exploded cross-section according to a second embodiment of providing the glass panel according to FIG. 4A.

FIG. 4B and FIG. 4C show a first and a second embodiment, respectively, for manufacturing the multi-layered glass panel 100 of FIG. 4A. In the first embodiment of FIG. 4B, the out-coupling pattern 106 is provided on a surface of the interlayer 103. The surface with the out-coupling pattern 106 thereon is then attached to a surface of the interior glass panel 102, e.g. by application of heat and pressure in an autoclave. Due to the low area coverage and small dots of the pattern 106 there remains sufficient surface area of the interlayer 103 to be attached to the interior glass panel 102.

The interlayer material may be a flexible foil and the out-coupling pattern 106 may be provided on the interlayer material by a simple processing technique, e.g. inkjet printing. Since the flexible foil may for example be stored on a roll, the flexible foil may be provided with the out-coupling pattern 106 using a common roll-to-roll inkjet printer.

For vehicle roofs, the multi-layered glass panel 100 usually is curved in two dimensions. When printing on the flat foil of interlayer material, the printed pattern may be adapted and prepared to the required stretching of the interlayer foil when the foil is provided on the curved interior glass panel 102. For example, for achieving a pattern of dots aligned on a rectangular grid, as e.g. shown in FIG. 3C, the dots of the out-coupling pattern 106 as printed on the flat foil will need to be positioned on a different, non-rectangular grid. The non-rectangular grid is in such embodiment determined in accordance with the expected stretch and will, after stretch on the interior glass panel 102, be substantially rectangular.

In another embodiment the out-coupling pattern 106 is applied directly on the interior glass panel 102. A suitable technique is screen printing, although other techniques may be used as well. For example, inkjet printing may be applied.

Applying the out-coupling pattern 106 on the interior glass panel 102 may be performed prior to or after bending of the interior glass panel 102. Prior to bending, the interior glass panel 102 is a flat glass plate, which eases the application of the out-coupling pattern 106 and many techniques can easily be used. Still, there may be a risk of damaging the printed out-coupling pattern 106 upon bending the interior glass panel 102.

After bending, it may become more challenging to apply the out-coupling pattern 106. For example, using inkjet printing, a robotic arm may follow the curved contours of the surface of the interior glass panel 102, while applying the pattern 106, or the curved interior glass panel 102 may be temporarily flattened on a table, e.g. a suction table, which is suitable for using screen printing.

Figure 4D:
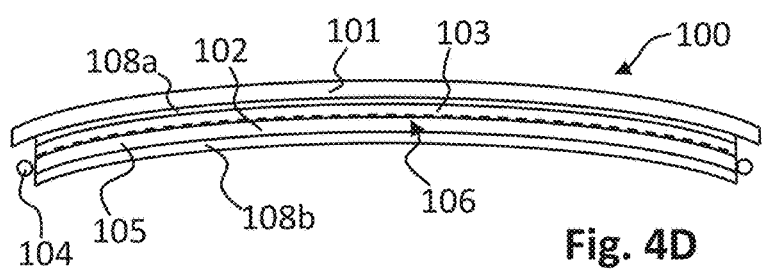
FIG. 4D shows a cross-section of a further embodiment of a multi-layered glass panel for use in the present invention.

FIG. 4D shows an embodiment of a multi-layered glass panel 100 for use in an open roof assembly according to the present invention, wherein further a first and a second functional layer 108a and 108b are introduced compared to the embodiment of FIG. 4A. In this embodiment, between the exterior glass panel 101 the interlayer 103, the first functional layer 108a is provided. The first functional layer 108a may essentially be any functional layer. For example, a switchable sun-shading layer like an electrochromic layer, SPD layer or PDLC layer may be provided to control an amount of exterior light passing through the multi-layered panel 100. The first functional layer 108a may, alternatively or additionally, comprise a passive layer such as an infrared-light filtering layer, as known in the art.

The second functional layer 108b is provided on an interior side of the interior glass panel 102. Thus, light coming from the light source 104 and redirected by the out-coupling pattern 106 into the vehicle interior passes through the second functional layer 108b. This second functional layer 108b may therefore be a functional layer that uses this light. For example, the second functional layer 108b may be a display layer and in particular a liquid crystal display (LCD) layer. As a planar source of light, the micro-dot out-coupling pattern 106 is suitable as a source of backlight for such a LCD display layer. Moreover, during daylight conditions, the LCD display layer may also be used as a means for filtering the light or for shielding against an excessive amount of light, thereby functioning as a sun-shade, in addition to or as an alternative for the first functional layer 108a.

As apparent to those skilled in the art, the first and the second functional layers 108a, 108b may provide for any other function as well, wherein each functional layer may be an active layer or a passive layer.

It is noted that in this embodiment of FIG. 4D, two additional functional layers 108a, 108b have been shown and described. As apparent to those skilled in the art, more functional layers may be added or either one of the shown functional layers 108a, 108b may be omitted, depending on the desired functionality of the multi-layered glass panel 100.

Figure 5A:
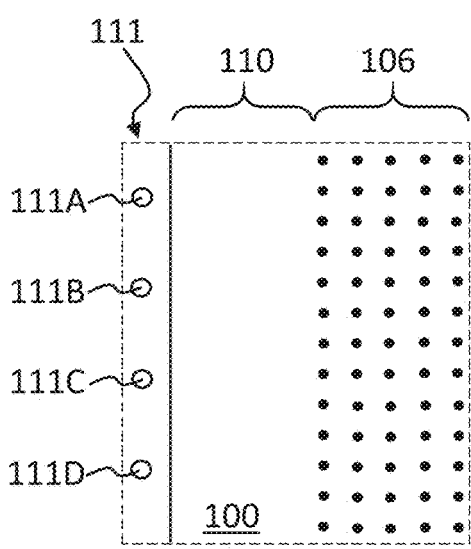
FIG. 5A shows a partial top view of an embodiment of a glass panel.
Figure 5B:
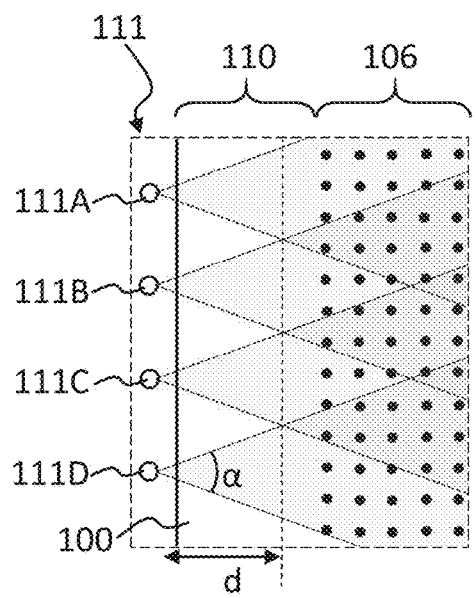
FIG. 5B shows the partial top view of the embodiment of a glass panel according to FIG. 5A.

FIGS. 5A and 5B illustrate a further embodiment, wherein an uncovered area 110 is provided between an array 111 of individual light sources 111A-111D, such as e.g. LED's, and an out-coupling pattern 106. As shown in FIG. 5B, the individual light sources 111A-111D each emit a respective bundle of light 112A-112D having a bundle angle α. Only after a predetermined distance d, adjacent individual bundles overlap. Hence, over the distance d, individual bundles can be visible. To reduce the visibility thereof, no out-coupling dots are provided in the uncovered area.

The distance d is dependent on a distance between the individual light sources 111A-111D and the bundle angle α, for example. Moreover, a distance for the light to become uniform may be larger than the distance d. Therefore, as apparent to those skilled in the art, a width of the uncovered area, i.e. a distance between the individual light sources 111A-111D and the out-coupling pattern 106 may be suitably selected dependent on the requirements, wherein also other aspects may be considered such as the distance between the individual light sources 111A-111D.

In a particular embodiment, the individual light sources 111A-111D may have different colors. For example, the light sources 111A-111D may have three colors like red, green and blue (RGB). Mixing the colors RGB leads to white light. The uncovered area may be designed and arranged such that the out-coupling pattern 106 is arranged at a distance where the three colors are mixed to white light. Then, depending on which light sources 111A-111D are switched on, the color of light out-coupled may be varied without the separate different colors of the light sources 111A-111D being locally visible close to the individual light sources 111A-111D.

Figure 6A:
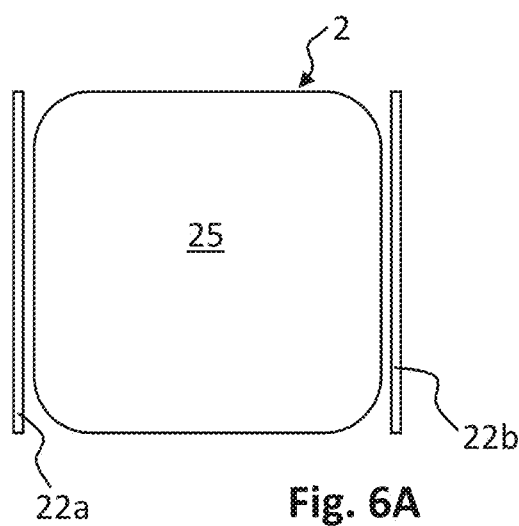
FIGS. 6A-6B are a top view of a first embodiment of a panel.
Figure 6B:
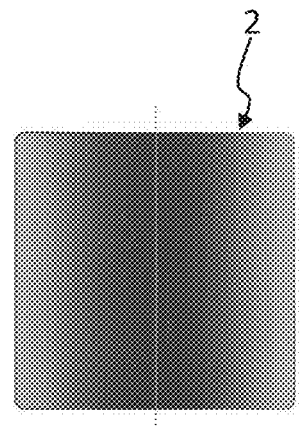

FIG. 6A shows a first embodiment of the present invention, wherein a moveable or fixed panel 2 of an open roof assembly is provided with a transparent area 25 and a first light guide 22a and a second light guide 22b. In the transparent area 25, a uniform out-coupling pattern, e.g. cf. FIG. 3C, is provided in accordance with the present invention, i.e. with relatively small dots and a low total surface area coverage. When both light guides 22a, 22b are lit up by a suitable light source (not shown), a light spread as shown in FIG. 6B is obtained (see also Table 3 above). Close to the light guides 22a, 22b a relatively large amount of light is coupled out, while in a center part of the transparent area 25 significantly less light is coupled out.

Figure 6C:
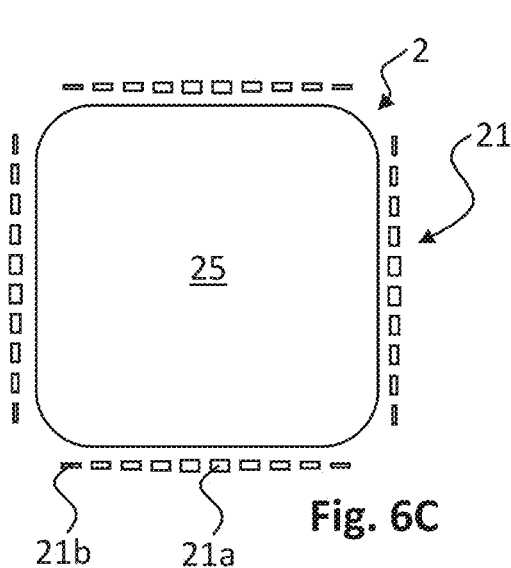
FIGS. 6C-6D are a top view of a second embodiment of a panel.
Figure 6D:
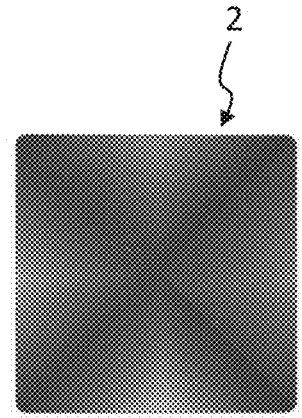

FIGS. 6C and 6D illustrate a second embodiment of the present invention, wherein the light is provided by light sources 21, e.g. LED's, directly into the panel 2. Individually addressable light sources 21 and/or providing light sources 21 along each edge of the panel 2 allow to provide for a light pattern in the transparent area 25. For example, with more intense light output (indicated by larger blocks) from the light sources 21a directed at a center of the transparent area 25 and less intense light output (indicated by smaller blocks) from the light sources 21b arranged near a corner of the panel 2, a star-like light pattern is obtainable as shown in FIG. 6D. Many other patterns may be obtained as apparent to those skilled in the art.

Figure 7A:
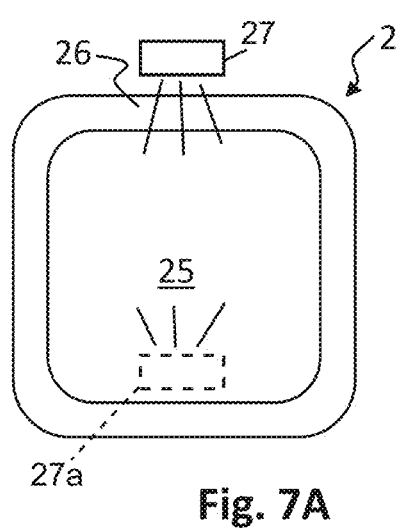
FIGS. 7A-7B are a top view of a third embodiment of a panel.
Figure 7B:
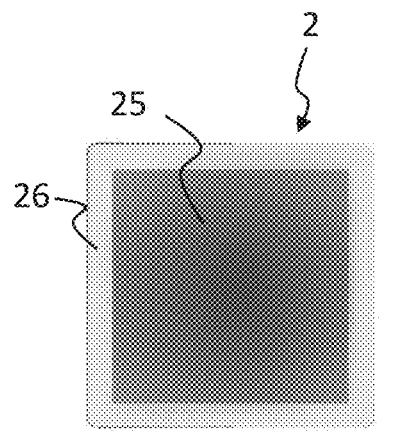

Other light effects may be obtained by adapting the local total surface area coverage of reflective dots. For example, as shown in FIGS. 7A and 7B, the panel 2 may comprise a transparent area 25 and an opaque area 26. In the already opaque area 26, a total surface area coverage may be relatively high such to obtain a significantly higher luminance as shown in FIG. 5B. Moreover, as shown in e.g. U.S. Pat. No. 9,006,751 (see e.g. FIG. 13), which is incorporated herein by reference in its entirety, a light source 21 may be provided in a recess in a transparent panel. Arranging a light source 21 at a boundary between the transparent area 25 and the opaque area 26 may provide a suitable configuration. In a particular embodiment, at least two light sources 21 may be provided in such a recess at said boundary such that it may be selected which of the transparent and opaque areas 25, 26 is lit up. Of course, the light source may be provided in such a recess in any other embodiment as well and is thus not limited to an embodiment having a transparent area and an opaque area.

In an embodiment, the local total surface area coverage may be adapted to obtain a more uniform light image. In such embodiment, the total surface area coverage near the light source may be kept low, while farther away the local total surface area coverage may be increased.

Figure 8:
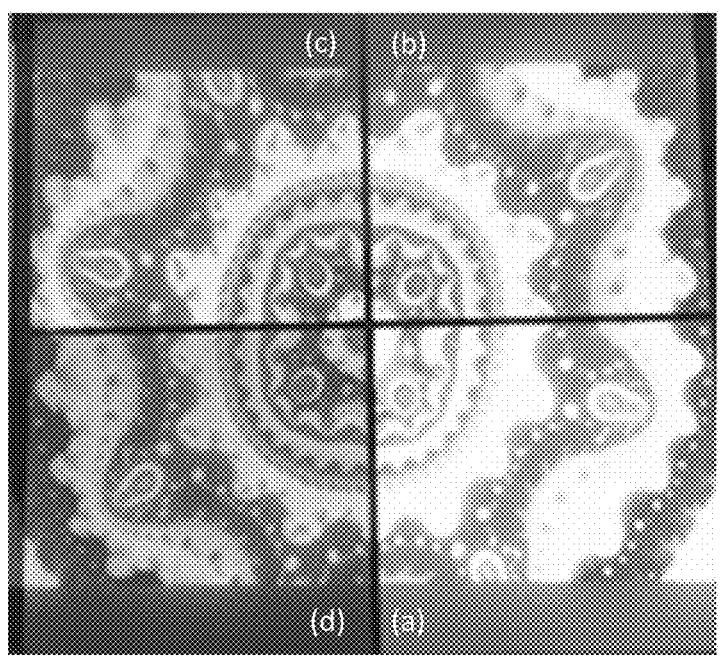
FIG. 8 shows the glass panel of FIG. 3A having an image projected thereon in accordance with an embodiment of the present invention.

FIG. 8 illustrates a further application of the out-coupling pattern according to the present invention. FIG. 8 shows the glass panel 30 of FIG. 3A, wherein in day light conditions an image is projected on the out-coupling pattern by a common beamer device. A difference in the amount of reflected light per area due to the differences in total surface area coverage is clearly visible in a difference in contrast in the image. One or more projectors (e.g. 27 and/or 27A) may be arranged in a vehicle in location(s)(e.g. directly below or below so as to project at an inclined angle) that are suitable for projecting images or movies on the transparent area 25 of the opaque area 26, if any. These may be projected as entertainment, but may as well be used in a more functional way. For example, warning signals may be projected.

In general, by use of one or more projectors and/or by suitable light sources such as individually addressable LED's, e.g. red, green and blue LED's, the open roof assembly may be used to generate a certain ambiance in the interior of the vehicle. For example, on a hot day, blue light may be created which results in a cool feeling, while on a cold day, more reddish light may be provided. Colors of the light may also be used for keeping the driver awake (blue light) or warn the driver for upcoming traffic, when coupled to a navigation system, by creating an alerting ambiance (red/yellow), for example.

More effects and/or light output increase without affecting a transparency of the panel 2 may be achieved by e.g. using not only reflective dots. For example, the dots may be formed of a photoluminescent ink. In particular, a fluorescent white ink may be applied and a suitable light source, e.g. an UV light source, may be used additionally or alternatively.

Further, it is noted that the actual luminance is dependent on the light output of the light source. Using multiple LED's along the panel 2 may be expected to provide for more light output compared to an embodiment with only a single light source and light guide. It is however noted that in an embodiment with a light guide, multiple light sources may be used as well, e.g. with aid of a branched/forked light guide with multiple light sources directing light into the light guide. Further, the light source may have a selectable light output (dimmable) in order to provide for the possibility to adapt the light output. It has been shown that with high intensity light sources such as suitable LED's, the total surface area coverage of the dots may be further reduced, while maintaining sufficient light output. In particular, a total surface area coverage of dots of opaque white ink may be reduced to about 3% or even less.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims may be applied in combination and any advantageous combination of such claims are herewith disclosed.

Further, it is contemplated that structural elements may be generated by application of three-dimensional (3D) printing techniques. Therefore, any reference to a structural element is intended to encompass any computer executable instructions that instruct a computer to generate such a structural element by three-dimensional printing techniques or similar computer controlled manufacturing techniques. Furthermore, any such reference to a structural element is also intended to encompass a computer readable medium carrying such computer executable instructions.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described it is apparent that the same may be varied in many ways. Such variations are not to be regarded as a departure from the spirit and scope of the invention, and all such modifications as would be apparent to one skilled in the art are intended to be included within the scope of the following claims.

The invention claimed is:

1. A transparent roof assembly for a vehicle roof, the roof assembly comprising
    a panel having a transparent area, the panel being configured to be arranged over an opening in the vehicle roof to allow visible light to pass in a first direction through the transparent area, the first direction extending between an interior of the vehicle and an exterior of the vehicle and substantially perpendicular to a surface of the panel;
    a light source arranged to provide light in the panel in a second direction, wherein the second direction is substantially perpendicular to the first direction;
    an out-coupling pattern arranged on the surface of the transparent area of the panel, the out-coupling pattern comprising dots of a light-redirecting material for out-coupling of light propagating in the panel, each dot having a dot surface area;
    wherein the dots each have a representative diameter of 150 microns or less, wherein the representative diameter of a dot corresponds to a diameter of a circle having a same surface area as the dot surface area of said dot; and
    wherein a total dot surface area of the dots of the out-coupling pattern equals a sum of the dot surface area of all dots arranged on the surface of the transparent area and wherein the total dot surface area is smaller than 10% of a total surface area of the transparent area.

2. The transparent roof assembly according to claim 1, wherein the representative diameter is within a range from about 50 microns to about 80 microns.

3. The transparent roof assembly according to claim 2, wherein the representative diameter is within a range from about 50 microns to about 70 microns.

4. The transparent roof assembly according to claim 1, wherein the representative diameter is within a range from about 20 microns to about 50 microns.

5. The transparent roof assembly according to claim 1, wherein the total dot surface area is in a range from about 1% to about 7%.

6. The transparent roof assembly according to claim 5, wherein the total dot surface area is in a range from about 3% to about 6% of the total surface area of the transparent area.

7. The transparent roof assembly according to claim 6, wherein the total dot surface area is in a range from about 4% to about 5% of the total surface area of the transparent area.

8. The transparent roof assembly according to claim 1, wherein the dots are regularly arranged on the surface, the dots being arranged at a spacing distance between adjacent dots, and wherein the spacing distance is more than 3 times the representative diameter.

9. The transparent roof assembly according to claim 8, wherein the spacing distance is more than 4 times the representative diameter.

10. The transparent roof assembly according to claim 9, wherein the spacing distance is more than 5 times the representative diameter.

11. The transparent roof assembly according to claim 1, wherein the light source comprises multiple individual light sources, in particular multiple LED's.

12. The transparent roof assembly according to claim 11, wherein the multiple individual light sources comprise multiple LED's.

13. The transparent roof assembly according to claim 1, wherein a dot coverage is a ratio of a total dot surface area of all dots in a unit area over a total surface area of the unit area and wherein the dot coverage close to the light source is lower compared to the dot coverage farther away from the light source.

14. The transparent roof assembly according to claim 1, wherein the panel further comprises an opaque area, a dot coverage in the opaque area being higher than in the transparent area.

15. The transparent roof assembly according to claim 1, wherein the panel further comprises an uncovered area, in which area no out-coupling pattern is present.

16. The transparent roof assembly according to claim 1, wherein the light source is provided in a recess in the panel.

17. The transparent roof assembly according to claim 16, wherein the light source is provided in a recess at a boundary of the transparent area.

18. The transparent roof assembly according to claim 1, wherein the transparent roof assembly further comprises an image projector for projecting a light image, wherein the image projector is arranged to project the light image on the out-coupling pattern.

19. The transparent roof assembly according to claim 1, wherein the light-redirecting material comprises at least one of a reflective material and a photoluminescent material.

* * * * *